(12) United States Patent
Hagiopol et al.

(10) Patent No.: US 7,863,395 B2
(45) Date of Patent: Jan. 4, 2011

(54) POLYACRYLAMIDE-BASED STRENGTHENING AGENT

(75) Inventors: Cornel Hagiopol, Lilburn, GA (US); Yuping Luo, Duluth, GA (US); David F. Townsend, Loganville, GA (US); James W. Johnston, Suwanee, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 975 days.

(21) Appl. No.: 11/613,758

(22) Filed: Dec. 20, 2006

(65) Prior Publication Data

US 2008/0149287 A1   Jun. 26, 2008

(51) Int. Cl.
C08F 220/56 (2006.01)

(52) U.S. Cl. ............... 526/220; 526/217; 526/303.1; 526/307.3; 526/310; 526/312; 525/329.4

(58) Field of Classification Search ........... 526/217, 526/220, 303.1, 307.3, 310, 312; 525/329.4
See application file for complete search history.

(56) References Cited

U.S. PATENT DOCUMENTS

| | | | |
|---|---|---|---|
| 2,926,116 A | 2/1960 | Keim | |
| 2,926,154 A | 2/1960 | Keim | |
| 3,556,932 A * | 1/1971 | Coscia et al. | 162/166 |
| 3,556,933 A | 1/1971 | Williams | |
| 3,607,622 A | 9/1971 | Espy | |
| 3,773,612 A | 11/1973 | Avis | |
| 4,060,507 A | 11/1977 | Floyd et al. | |
| 4,217,425 A | 8/1980 | Ballweber et al. | |
| 4,501,640 A | 2/1985 | Soerens | |
| 4,508,594 A | 4/1985 | Jansma et al. | |
| 4,528,316 A | 7/1985 | Soerens | |
| 4,603,176 A | 7/1986 | Bjorkquist et al. | |
| 4,605,702 A | 8/1986 | Guerro et al. | |
| 4,605,718 A | 8/1986 | Jansma et al. | |
| 4,785,055 A | 11/1988 | Dexter et al. | |
| 4,853,431 A | 8/1989 | Miller | |
| 4,954,538 A | 9/1990 | Dauplaise et al. | |
| 4,966,652 A | 10/1990 | Wasser | |
| 5,147,908 A | 9/1992 | Floyd et al. | |
| 5,179,150 A | 1/1993 | Furman | |
| 5,187,219 A | 2/1993 | Furman | |
| 5,401,810 A | 3/1995 | Jansma et al. | |
| 5,427,652 A | 6/1995 | Darlington et al. | |
| 5,466,337 A | 11/1995 | Darlington et al. | |
| 5,567,798 A | 10/1996 | Dulany et al. | |
| 5,585,456 A | 12/1996 | Dulany et al. | |
| 5,674,362 A | 10/1997 | Underwood et al. | |
| 5,763,523 A | 6/1998 | Chen et al. | |
| 5,763,530 A | 6/1998 | Chen et al. | |
| 5,783,041 A | 7/1998 | Underwood | |
| 5,869,589 A | 2/1999 | Raynolds et al. | |
| 5,883,181 A | 3/1999 | Cicchiello et al. | |
| 5,914,366 A | 6/1999 | Cicchiello et al. | |
| 5,951,719 A | 9/1999 | Cooper et al. | |
| 6,077,394 A | 6/2000 | Spence et al. | |
| 6,080,804 A | 6/2000 | Davies et al. | |
| 6,103,861 A | 8/2000 | Staib | |
| 6,197,919 B1 | 3/2001 | Crisp et al. | |
| 6,214,932 B1 | 4/2001 | Maslanka | |
| 6,245,253 B1 | 6/2001 | Grasshoff et al. | |
| 6,429,253 B1 | 8/2002 | Guerro et al. | |
| 6,491,790 B1 | 12/2002 | Proverb et al. | |
| 7,034,087 B2 | 4/2006 | Hagiopol et al. | |
| 7,119,148 B2 | 10/2006 | Hagiopol et al. | |
| 2004/0118541 A1 | 6/2004 | Shannon | |
| 2005/0187356 A1 * | 8/2005 | Hagiopol et al. | 525/329.4 |
| 2006/0037727 A1 | 2/2006 | Hagiopol et al. | |
| 2006/0041085 A1 | 2/2006 | Hagiopol et al. | |
| 2006/0270801 A1 | 11/2006 | Hagiopol et al. | |

OTHER PUBLICATIONS

Pruszynski, Przemyslaw, Recent Developments in Papermaking Chemicals, Nalco Chemical Co. ; http ://wwwcsi.unian.it/educa/inglese/paperche.html accessed Apr. 19, 2006.
Specification: PAREZ® 631 NC, Wet Strength Resin, Bayer.
Specification: PAREZ® 745, Temporary Wet Strength Resin, Bayer.

* cited by examiner

*Primary Examiner*—Roberto Rabago
(74) *Attorney, Agent, or Firm*—Michael S. Kerns

(57) ABSTRACT

A method for preparing a cationic polyacrylamide composition particularly suitable for making a glyoxylated polyacrylamide composition useful as a temporary wet-strengthening agent and the composition resulting from that method, along with the use of the composition for adding temporary wet strength to paper and the resulting strengthened paper products.

12 Claims, No Drawings

POLYACRYLAMIDE-BASED STRENGTHENING AGENT

FIELD OF THE INVENTION

The present invention relates to an improved method for preparing a cationic polyacrylamide. The cationic polyacrylamide is particularly suitable for making a glyoxylated polyacrylamide, which is useful as a temporary wet-strengthening agent. The invention also relates to compositions resulting from these methods and the use of the compositions for adding temporary wet strength to paper and to the resulting strengthened paper products. The compositions preferably are added at the wet end of a paper machine.

BACKGROUND OF THE INVENTION

There are a wide variety of wet end additives used for strengthening paper products. For instance, water-soluble polyacrylamides have been used to impart dry strength and temporary wet strength to paper products. Such polymers can have a sufficient cationic character to provide an affinity to paper fibers and can be made thermosetting to improve their strength-enhancing character.

One known subset of polyacrylamide strengthening agents is those which have been modified with glyoxal to make them thermosetting. Coscia et al, U.S. Pat. No. 3,556,932, appears to be the first disclosure of these materials wherein the glyoxalation of vinylamide (e.g., acrylamide) polymers is described as producing a wet strengthening resin. The acrylamide polymer can also include other monomers that confer ionic properties, or act as diluents or spacers.

The base polymer is reacted with sufficient glyoxal to form a water-soluble polymer which is thermosetting. The base polymer is reacted with glyoxal under alkaline conditions until a slight increase in viscosity occurs and then is acid quenched. According to the patent, only about half of the added glyoxal reacts and unreacted glyoxal remains dissolved in the water. The unreacted glyoxal is said to remain in the papermaking whitewater and does not act as a strengthening agent. In one embodiment, the acrylamide polymer and the glyoxal are pre-blended in a dry particulate state and combined shortly before use in warm water.

Glyoxal (CHOCHO) reacts with amide groups on the polyacrylamide backbone according to the following reaction:

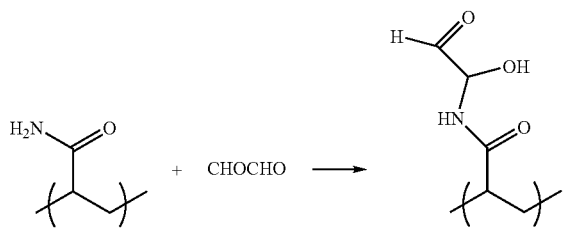

A second reaction involves the so-formed aldehyde moiety on the polymer backbone with another amide group and leads to building molecular weight and cross-linking.

Avis, U.S. Pat. No. 3,773,612 teaches wet strength resins comprising a co-polymer of glyoxal, acrylamide, formaldehyde and urea. Acrylamide, formaldehyde and glyoxal are reacted in the presence of isopropyl alcohol, water and N,N dimethylaminoethylmethacrylate to form the methylolated and glyoxalated acrylamide. The reactions are performed at a pH in the range of from about 8 to about 9 for about 10 to 15 minutes where after the pH is adjusted downward to between about 3.0 and about 5.0. Thereafter, additional acrylamide and urea are added and condensation polymerization reactions between the glyoxalated and methylolated acrylamide and the newly added urea and acrylamide proceed. Ammonium persulfate may then be added to initiate free radical polymerization of the vinyl components of the system. The reaction is stopped when the mixture is diluted with water and hydroquinone.

Ballweber et al. U.S. Pat. No. 4,217,425 teaches a blend of a non-ionic polyacrylamide, polymeric diallyldimethyl ammonium chloride (DADMAC) and glyoxal as a paper strengthening agent. Glyoxal is present to impart crosslinking and the DADMAC functions as a cationic modifier. The blend is prepared under slightly alkaline conditions and held at 40° C. until a desired amount of crosslinking has occurred. An acid kill is then used to decrease the pH from about 7.2 to about 4.0. Thereafter, tetrasodium pyrophosphate is utilized as a buffer.

Bjorkquist, et al, U.S. Pat. No. 4,603,176 describes a glyoxylated acrylamide polymer for imparting temporary wet strength to paper, characterized in that the acrylamide polymer was prepared with a significant amount of a polar, non-nucleophilic monomer that is non-reactive with glyoxal and does not cause the polymer to become water-insoluble. The polar, non-nucleophilic monomer is added to reduce the amount of homo-crosslinking that occurs during use.

Guerro et al, U.S. Pat. No. 4,605,702 also describes a glyoxylated, cationic acrylamide polymer for imparting temporary wet strength to paper, characterized in that the acrylamide polymer has a low molecular weight ranging from about 500 to about 6000 before glyoxalation and the ratio of glyoxol units to acrylamide units ranges from about 0.1-0.5:1.0.

In an attempt to avoid the stability problems that confront glyoxalated polyacrylamide strengthening agents, Dauplaise et al, U.S. Pat. No. 4,954,538 describe microparticles of a cross-linkable, glyoxalated, cationic (meth) acrylamide polymer useful as wet- and dry-strengthening agent prepared using an inverse microemulsion polymerization technique. Dauplaise et al., indicate that commercial gloxylated acrylamide polymers, supplied as 10% solid solutions, gel within about 8 days at room temperature.

Floyd et al, U.S. Pat. No. 5,147,908 describes a polyvinyl alcohol terpolymer prepared by reacting a polyvinyl alcohol polymer with an aqueous solution of a blocked glyoxal resin and a cationic water-soluble, aldehyde-reactive polymer. The so-produced cationic polyvinyl alcohol additive is reportedly highly adsorbent on cellulose pulp and thus suitable for addition to pulp at the wet-end of a paper making process. The glyoxal resin component of this mixture is blocked to prevent it from reacting fully with the other components prior to drying. Inhibiting the reactivity of the glyoxal resin presumably allows a product to be formulated at higher solids and/or lower viscosity than otherwise possible with unblocked glyoxal resin. Suitable blocking components include urea, substituted ureas (such as dimethyl urea), various cyclic ureas such as ethylene urea, substituted ethylene ureas (such as 4,5-dihydroxyethylene urea), propylene urea, substituted propylene ureas (such as 4-hydroxy-5-methyl-propylene urea, or 4-hydroxy-5,5-dimethyl propylene urea), glycols (such as ethylene glycol to make 2,3-dihydroxydioxane, or dipropylene glycol to make an oligomeric condensation product), polyols (i.e. containing at least three hydroxy groups such as sorbitol or glycerin to make 2,3-dihydroxyl-5-hydroxymethyl dioxane) as well as unalkylated or partially alkylated polymeric glyoxal derived glycols, such as poly(N-1',2'-dihydroxyethyl-ethylene urea).

U.S. Pat. Nos. 4,508,594; 4,605,718, 5,401,810 all to Jansma et al describe polyacrylamides having acetal and hemiacetal function purportedly having improved stability.

The art continues to search for ways for producing polyacrylamides useful for preparing improved strengthening agents and especially improved glyoxylated polyacrylamide strengthening agents.

DETAILED DESCRIPTION OF THE INVENTION

The present invention is directed to a method for preparing a cationic polyacrylamide. While the polyacrylamide can be used to strengthen paper, it has particular utility as a base polymer composition suitable for making a glyoxalated polyacrylamide composition useful as a temporary wet strengthening agent. The so-prepared glyoxalated polyacrylamide composition provides a higher charge density, longer shelf life (e.g., improved stability) and better wet strength decay than prior art glyoxalated compositions.

The invention also relates to the use of the glyoxalated polyacrylamide composition for adding strength to paper and to the resulting strengthened paper products. The composition preferably is added at the wet end of a paper machine.

The invention also relates to a new class of materials useful as an additive for the glyoxalated polyacrylamide composition of the present invention. These materials are the reaction products of an acrylamide monomer or monomers and certain amines, referred to hereinafter as "polyacrylamide-adducts." These materials can be added during the preparation of the of the cationic polyacrylamide composition, during the glyoxalation of the cationic polyacrylamide composition, or as a scavenger to the glyoxalated polyacrylamide composition.

The present invention is specifically directed to an improved method for synthesizing a cationic polyacrylamide composition that can be used to produce a glyoxylated polyacrylamide composition of higher charge density.

The cationic polyacrylamide composition of the present invention, which subsequently can be glyoxalated to produce a glyoxalated polyacrylamide composition suitable for use as a temporary wet strengthening agent, is prepared by free radical polymerization of an acrylamide monomer or monomers in an aqueous system in the presence of a cationic monomer or monomers and a chain transfer agent, such as 2-mercaptoethanol.

The term "polymer" is used throughout this application in its conventional sense to refer to compounds having about three or more repeating monomer units. The term "monomer" is used herein to refer to compounds that are not polymeric.

As used herein, "crosslinked" and similar terms are intended to embrace the structural and/or morphological change that occurs, for example, by covalent chemical reaction or ionic interaction between separate molecules in a composition.

As used throughout the specification and claims, the term "acrylamide monomer" is intended to embrace primary vinylamides including not only acrylamide itself but also substituted acrylamides such as methacrylamide, ethylacrylamide, crotonamide N-methyl acrylamide, N-butyl acrylamide, N-ethyl methacrylamide and the like. Thus, polyacrylamides, which by definition are polymers made from repeating acrylamide monomers, include repeating units from at least some of these various compounds.

Acrylamide monomer(s) provide(s) the primary reaction sites on the cationic polyacrylamide base polymer backbone to which the glyoxal substituents are subsequently attached in the glyoxalated polyacrylamide composition of the present invention. The cationic base polymer preferably has a sufficient number of acrylamide monomers in its structure so that, once functionalized with glyoxal, the resulting polymer is thermosetting. Generally, the amount of acrylamide monomer should be at least about 10 mole percent based on the total number of monomers used to prepare the cationic polyacrylamide polymer. Higher amounts are usually preferred as this has a beneficial effect on the paper strengthening properties of the resulting polymer. As a result, acrylamide monomer is normally provided in an amount of at least about 50 mole percent and sometimes in excess of 75 mole percent of the total number of vinyl monomers from which the cationic polyacrylamide is prepared.

In addition to the acrylamide monomer(s), the reaction mixture also includes a sufficient amount of unsaturated cationic monomer(s) to provide the ultimate polyacrylamide polymer with a suitable cationic character for strengthening paper. The amount of cationic monomer(s) should be sufficient to render the polyacrylamide base polymer and any glyoxalated polyacrylamide composition prepared from the polyacrylamide base polymer self-substantive to cellulose fibers in aqueous suspensions. The quantity of polymer retained on the cellulose fibers can be determined by measuring the nitrogen content of the fibers both before and after treatment with the polyacrylamide composition, as known to those skilled in the art.

Typically, a few cationic monomer(s) molecules, and in some cases a single cationic monomer molecule, integrated into each polyacrylamide base polymer molecule may be sufficient to provide the polymer with an adequate cationic character to make the polymer substantive to cellulose fibers. A polymer with a suitable amount of cationic character thus can usually be obtained by including at least about 0.001 mole of cationic monomer and upwards of 0.35 mole and possibly more of cationic monomer, per mole of acrylamide monomer in the reaction mixture. Usually an amount between 0.01 and 0.25 mole of cationic monomer per mole of acrylamide monomer should be satisfactory, with an amount between 0.1 and 0.15 being more typical. Usually, one can provide sufficient cationic monomer by including from about 1 to 20% by weight in the monomer mixture from which the polyacrylamide in prepared.

Suitable cationic monomers for conferring a cationic character to the base polyacrylamide polymer when dissolved in water include a diallyl quaternary monomer (generally diallyl dimethyl ammonium chloride, DADMAC), 2-vinylpyridine, 4-vinylpryridine, 2-methyl-5-vinyl pyridine, 2-vinyl-N-methylpyridinium chloride, p-vinylphenyl-trimethyl ammonium chloride, 2-(dimethylamino) ethyl methacrylate, trimethyl(p-vinylbenzyl)ammonium chloride, p-dimethylaminoethylstyrene, dimethylaminopropyl acrylamide, 2-methylacroyloxyethyltrimethyl ammonium methylsulfate, 3-acrylamido-3-methylbutyl trimethyl ammonium chloride, 2-(dimethylamino)ethyl acrylate and mixtures thereof to name a few. In addition to chloride, the counter-ion for the cationic monomer also can be fluoride, bromide, iodide, sulfate, methylsulfate, phosphate and the like.

Other vinyl monomers that can be present during preparation of the cationic polyacrylamide and thus become incorporated into the base polymer include (1) diluter monomers, i.e., monomers that reduce the concentration of required monomers in each polymer but do not provide any functional site for modification of the polymer, and (2) other functional monomers, i.e., non-amide vinyl monomers that can be incorporated into the base polymer and have pendant groups that also can react with glyoxal.

Diluter monomers include, for example, acrylic acid, acrylic esters such as ethyl acrylate, methylmethacrylate and the like, acrylonitrile, vinyl acetate, vinyl benzene sulfonic acid, N-vinyl pyrrolidone, N,N'-dimethyl acrylamide, hydroxyalkyl(meth)acrylates (such as hydroxyethyl acrylate), styrene and the like, to name a few. Hydroxyethyl acrylate is a preferred diluter monomer as its use appears to improve the stability of the glyoxalated composition and paper softness in the wet strengthened product.

Functional monomers include, for example, allylglycidal ether, glycidyl methacrylate and the like, to name a few.

The diluter monomers can be present in the reaction mixture in an amount of up to about 0.5 mole per mole of acrylamide monomer, while the amount of functional monomers should not exceed about 0.15 mole per mole of acrylamide monomer. Usually, one can provide the diluter monomer in an amount from about 0 to 20% by weight in the monomer mixture from which the polyacrylamide in prepared. The amount and ratio of the diluter and functional monomers in the reaction mixture can be used as another control of the extent and distribution of glyoxalation. In addition, since the final polymer composition must be cationic, one additional criteria with respect to these co-monomers is that they cannot be present in the polymer in amounts greater than the cationic monomer if the co-monomers are anionic in character.

Suitable cationic base polymers, for example, can be prepared from a mixture of acrylamide and diallyldimethyl ammonium chloride (DADMAC) in a molar ratio between 99:1 and 75:25.

As noted above, the cationic polyacrylamide base polymer is prepared by free radical polymerization among the acrylamide monomer(s), the cationic monomer(s) and the optional diluter and/or functional monomer(s) and is initiated using known free radical initiators. Commonly used free radical initiators that can be used in the present invention include the various peroxides, t-butyl hydroperoxide, cumene hydroperoxide, benzoyl peroxide, t-butoxyperoxy hexanoate and various azo compounds such as azodiisobutyronitrile (AIBN), azodiisobutyramidine dihydrochloride (AIBA) and dimethylazodiisobutyrate to name a few. Other useful initiators are the water-soluble peroxygen compounds such as hydrogen peroxide and the sodium, potassium and ammonium persulfates used by themselves or in activated redox systems.

As well understood by those skilled in the art, the amount of initiator should be sufficient to yield both an acceptable reaction rate and, in combination with the level of monomeric reactants and the chain transfer agent, as herein below described, a cationic polyacrylamide adduct of a suitable molecular weight to be water soluble. The amount of initiator, however, should not be so high as to result in an uncontrolled rate of reaction and possible gel formation. The amount of initiator used in the solution polymerization will generally be in the range of 0.01 to 3% by weight, based on the weight of the monomers, and is usually between about 0.2 and 2% by weight. Determining an amount of initiator for any particular combination of monomers is well within the skill of the artisan.

The method of the present invention is directed specifically to a procedure for synthesizing the polyacrylamide base polymer by bringing together the required acrylamide and cationic monomers and any optional diluter monomer(s) and other functional monomer(s) in a particular way to maximize the charge density and the cationic charge distribution of the cationic base polymer.

According to the method of the present invention, a reaction vessel is initially charged with (1) a solvent, generally water (which may be added with the other ingredients rather than separately), (2) a portion of the cationic monomer(s), and (3) a portion of a mixture of the acrylamide monomer(s), chain transfer agent(s) and any additional, optional co-monomer(s) (diluent monomer(s) and/or other functional monomer(s)) (hereinafter this initial mixture of the acrylamide monomer(s) and other ingredients is referred to as the "acrylamide monomer mixture"). This mixture is added to the reactor as the seed material for the polymerization reaction.

The portion of the cationic monomer(s) added at the start of the polymerization constitutes at least about 10% by weight of the total amount of cationic monomer(s) used in making the polyacrylamide, and more usually at least about 50% by weight of the total amount of cationic monomer(s). Preferably over about 90% by weight of the total amount of cationic monomer(s) initially is added to the reaction vessel and this amount is referred to in the specification and claims as "a substantially full amount." Preferably, the full amount of the cationic monomer is added to the initial reaction mixture. In the case of DADMAC in particular, it is preferred to have all of it present in the initial polymerization reactant mixture.

Only a minor portion of the acrylamide monomer mixture is initially added. A "minor amount" in this regards means about 5 to 30% by weight of the total acrylamide monomer charge. Preferably about 8-20% by weight of the acrylamide monomer mixture is added into the initial reaction mixture. This initial reaction mixture then is heated to a desired polymerization temperature.

In the presence of an initiator, the polymerization proceeds nicely at a temperature broadly in the range of 30 to 100° C., and is usually conducted in the range of 60 to 90° C.

Once the reaction mixture reaches the desired polymerization temperature, such as for example 80° C., a programmed addition of the initiator is started. The initiator is added, usually at a substantially constant rate, over a period of time slightly longer than the time over which the acrylamide monomer mixture is added. For example a period of time which typically is from 1% to 10% longer than the period of time over which the acrylamide monomer mixture is added. The time period over which the initiator is added is referred to hereinafter as the "reaction period." As appreciated by those skilled in the art, the reaction period is an inverse function of the reaction (polymerization) temperature; at lower temperatures a longer reaction time is required. In most instances a reaction period of about 180-200 minutes at a reaction temperature of about 80° C. should be suitable.

While the initiator is being added, one portion of the remaining acrylamide monomer mixture also is added at a substantially constant rate over a first portion of the reaction period. This one portion of the remaining acrylamide monomer mixture (considering also the amount of acrylamide monomer initially added to the reactor) broadly constitutes from about 15 to 95% of the total acrylamide monomer mixture, more usually from about 20 to 75% of the acrylamide monomer mixture. Preferably, this portion constitutes about 20-45% of the original acrylamide monomer mixture. Any cationic monomer not present in the reactor initially also is added ultimately as part of the acrylamide monomer mixture, preferably within the portion of the acrylamide monomer mixture added to the reactor in this first reaction period as identified herein.

The first portion of the reaction period typically constitutes about 40 to 75% of the total reaction period. With a reaction period of about 190 minutes at a reaction temperature of about 80° C., the first portion of the reaction period is about 63% of the reaction period, or about 120 minutes. During this step, the cationic monomer(s) is better incorporated into the backbone of the polyacrylamide polymer.

Once this first portion of the remaining acrylamide monomer mixture has been added a second portion of the remaining acrylamide monomer mixture (preferably all of the remaining portion of the acrylamide mixture) is added more rapidly over a second portion of the reaction period. The second portion of the reaction period constitutes the period of time from the end of the first reaction period until there is about 5 to 20% of the reaction period left. Thus, the second portion of the reaction period constitutes about 25 to 60 of the reaction period. Continuing with the same embodiment referenced above, with a reaction period of about 190 minutes at a reaction temperature of about 80° C., the second portion of the reaction period is about 32% of the total reaction period, or about 60 minutes, leaving an additional 5% of the reaction period, or about 10 minutes remaining, over which the remaining initiator is added. In this second portion of the reaction sequence, the main reaction is usually an acrylamide homopolymerization, the cationic monomer having already been previously incorporated into a polyacrylamide polymer.

Thus, the period over which the initiator is added ("the reaction period") usually is somewhat longer than the period over which the acrylamide monomer mixture is added. Generally, the synthesis is completed by adding some additional initiator to ensure that all of the monomers, especially the acrylamide monomers have been consumed.

The first and second reaction periods are conducted (their duration and the amount of acrylamide monomer mixture added during each period is apportioned) such that the acrylamide monomer is relatively slowly added during the first period and is rapidly added during the second period.

Using the polymerization sequence created by this programmed addition for the initiator, the cationic monomer(s) and the acrylamide monomer(s) results in a cationic acrylamide polymer of a much higher charge density and more desirable charge distribution than a polymer made using prior art synthesis techniques, such as that described in U.S. Pat. No. 7,119,148.

In some cases, it also may be desirable to conduct the reaction in the presence of an aliphatic alcohol in addition to the aqueous solvent, such as 4 to about 15 percent by weight of the aqueous reaction mixture of ethanol, isopropyl alcohol, n-propanol or butanol.

As noted above, another constituent of the reaction system is a chain transfer agent. As understood by those skilled in the art, the chain transfer agent functions to limit or control the molecular weight of the polymer formed by the free radical polymerization reaction taking place between the monomeric reactants. Thus, a chain transfer agent preferably is used in an amount sufficient to limit the molecular weight of the free radical polymerization adduct so that the resulting polyacrylamide is water-soluble. The amount of the chain transfer agent should not be so high, however, that it so severely limits the molecular weight of the resulting adduct that the polymer has a poor paper strengthening property. In order to accomplish these objectives, the chain transfer agent will generally be included in the reaction mixture in the range of about 0.1 to 30% by weight, based on the acrylamide monomers, and most often will be used in an amount between about 0.5 and 15 weight % and especially in an amount of 1 to 13 weight %. The determination of a suitable level of chain transfer agent to use in any monomer system is a matter of routine experimentation to those of ordinary skill in the art.

In the present invention, it is preferred to introduce the chain transfer agent along with the acrylamide monomer(s) as part of the acrylamide monomer mixture in order to maintain a desired ratio between the chain transfer agent and the acrylamide monomer(s) during the polymerization reactions.

Any material that is able to control/limit the extent of the polymerization via chain transfer can be used as the chain transfer agent. Suitable chain transfer agents include allyloxypropane diol, thioglycol, and mercaptans such as 2-mercaptoethanol, hydroxyethyl-3-mercaptopropionate and dodecylmercaptan to name a few. By using the chain transfer agent, one is able to limit the molecular weight and preserve the desired level of water solubility for the resulting free radical polymerization polyacrylamide product.

An amount of water (and optional water miscible solvent) generally is included in the reactor to provide a final solids concentration in the aqueous composition within the range of about 5 to about 50 weight percent. The solids concentration of the aqueous reaction mixture more usually is on the order of 10 to 30 weight percent.

Applicants have observed that a glyoxalated blend of cationic polyacrylamide and non-ionic polyacrylamide is a more efficient temporary wet strengthening agent (exhibiting higher charge density and higher paper wet strength decay). One of the advantages of the present invention is that the reaction sequence produces an in-situ blend of cationic and nonionic polyacrylamides in one reaction step. In particular, the method of the present invention produces polyacrylamide polymer adducts of lower molecular weight with a higher incorporation of the cationic monomer(s) into the polyacrylamide polymer. This higher incorporation of the cationic monomer(s) results in a higher charge density, typically an order of magnitude higher charge density, than the synthesis method described in U.S. Pat. No. 7,119,148.

The cationic charges also appear to have a more asymmetric distribution (which apparently contributes in some fashion to the higher measured charge density), which seems to enhance the retention of the polyacrylamide polymers on cellulose fibers and contributes also to a higher decay of the wet strength properties after soaking in water (i.e., an improved temporary wet strengthening property).

Suitable base polyacrylamide polymers made in accordance with the present invention, before glyoxalation, typically have a molecular weight within the range of 500 to 50,000, more usually in the range of 1000 to 20,000. It is preferred that the base polymer be water-soluble before glyoxalation. For the most part, polyacrylamide base polymers having a molecular weight of less than about 25,000 and especially less than 10,000 are normally preferred. The molecular weight of the base polyacrylamide is influenced by changing the level of solids in the reaction, changing the amount of initiator, changing the amount of chain transfer agent, changing the reaction temperature and other methods used by those skilled in the art. As a rule of thumb, the polyacrylamide has about 40 amide groups for every 3000 molecular weight.

In accordance with a preferred aspect of the present invention, the so-prepared cationic polyacrylamide base polymer composition then is glyoxalated. The glyoxalation is a condensation reaction which increases the molecular weight of the polyacrylamide composition.

To conduct the glyoxalation of the polyacrylamide, an amount of glyoxal to provide between about 10 to 110 mole percent glyoxal, based on the molar concentration of pendant amide groups (see paragraph [05] above) and other optional glyoxal-reactive functional groups in the polyacrylamide, is added.

Usually, the glyoxal is added in an amount of from 50 to 110 mole percent of the available glyoxal-reactive functional groups in the polyacrylamide, including the pendant amide groups. The glyoxal can be added all at once, or can be added as two or more separate portions to the polyacrylamide. Stated in another way, 1 to 11 glyoxals are supplied for every 10 pendant amide groups and other optional glyoxal-reactive functional groups in the polyacrylamide.

Usually, the glyoxalation is conducted at an alkaline pH in the range of 7.5 to 10.0. The pH can be controlled using a buffer system. A buffer of mono- and di-sodium phosphate is suitable, though other buffers would include any material that simultaneously functions as both a weak acid and a weak base, and is able to maintain the desired pH, such as monopotassium phosphate plus borax, sodium hydroxide plus a mixture of acetic, phosphoric and boric acids, disodium phosphate plus citric acid and the like to name a few.

To enhance stability it is preferable to add the glyoxal in two or more portions as described in U.S. Pat. No. 7,119,148, the disclosure of which is incorporated herein by reference.

The glyoxalation is generally conducted at a temperature of 20 to 50° C. A temperature of about 30° C. has proven to be suitable.

A procedure for determining the amount of bound glyoxal in the glyoxalated polymer is described in Biochemistry, Vol. 81, pp. 47-56 (1977), which is incorporated by reference herein. Additional details on suitable reaction conditions for binding glyoxal to the primary vinylamide also are described in U.S. Pat. No. 3,556,932, which is also incorporated by reference.

The two step glyoxalation procedure of U.S. Pat. No. 7,119,148 improves the stability of the glyoxylated polyacrylamide composition. Further stability enhancement of the glyoxylated polyacrylamide composition can be obtained by adding to it a buffer that regulates the pH of the glyoxalated polyacrylamide composition between about 3 and 3.5. One suitable buffer is a mixture of 20 parts by volume of a 0.2 M sodium hydroxide with 100 parts by volume of a stock solution containing 0.4 M acetic acid, 0.4 M phosphoric acid, and 0.4 M boric acid. This buffer has been shown to keep the pH of glyoxalated polyaerylamide compositions relatively constant over a period of at least six weeks. Other buffers that could be used include materials that simultaneously function as both a weak acid and a weak base, such as citric acid with sodium citrate, disodium phosphate with citric acid, succinic acid with borax, acetic acid with sodium acetate, monopotassium phthalate with hydrochloric acid, bicarbonates, carbonate esters, complex carbonate salts of organic acids, hydrogen phosphates, phosphate esters, phosphinate esters, borates, borate esters, hydrogen sulfates, sulfinates, and sulfate esters. Other examples of suitable buffers include potassium bicarbonate, potassium biphthalate, potassium bisulfate, potassium dihydrogen citrate, dipotassium hydrogen citrate, potassium dihydrogen phosphate, dipotassium hydrogen phosphate, potassium hydrogen tartrate, potassium hydrogen oxolate, potassium hydrogen maleate, potassium hydrogen succinate, potassium hydrogen glutarate, potassium hydrogen adipate, potassium tetraborate, potassium pentaborate, potassium octaborate and all the corresponding sodium salts, complex calcium carbonate salts of organic acids (such as octanoic acid, iso-octanoic acid, 2-ethyl hexanoic acid, hexanoic acid, and the like) and other similar materials known in the art.

Yet another improvement to the stability of the composition is garnered by adding an aldehyde scavenger to the glyoxalated polyacrylamide. The stability of the glyoxalated polyacrylamide depends to some degree upon a balance between the free glyoxal in the composition and the reactive pendant aldehyde and other functional groups. In order to reduce the reactivity of the aldehyde and other functional groups, a mono-functional aldehyde scavenger material preferably of a low volatility (high boiling point) is used. Preferably, compounds with a single hydroxyl group such as lactic acid, malic acid, citric acid, choline chloride and the like should be used. One particularly useful scavenger is an adduct of choline chloride and acrylamide, which is described in U.S. Pat. No. 7,034,087, incorporated herein by reference. Another useful scavenger is the polyacrylamide-adduct described hereinafter.

In the presence of such a scavenger, the pH tends to remain constant and the self-life of the composition tends to be longer. In the case of using choline chloride, a composition having a higher charge density that likely has a greater affinity for cellulose fibers also is obtained.

In order to maximize the initial wet strengthening ability of the glyoxalated polyacrylamide compositions of the present invention, it also may be desirable to increase the concentration of aldehyde pendent groups. In order to accomplish this goal, applicants have identified certain acrylamide-amine adducts (hereinafter referred to as "polyacrylamide-adducts") that can be added either to the initial reaction mixture or as another component of the acrylamide monomer mixture in the synthesis of the polyacrylamide composition. Alternatively, these adducts can be added, after the polyacrylamide synthesis, to the cationic polyacrylamide composition before the glyoxalation reaction is conducted. In yet another embodiment, these adducts can be used as a glyoxal scavenger after the glyoxalation has been conducted.

These polyacrylamide-adducts are prepare by reacting an amine, such as ammonia, ethylene diamine, diethylene triamne (DETA), triethylene tetraamine (TETA), a polyamidoamine, or a polyvinylamine with an acrylamide monomer. Suitable acrylamide monomers would include acrylamide, methacrylamide, N-alkyl acrylamide and N-alkyl methacrylamide to name a few.

The reaction proceeds in water at room temperature and is accompanied by a strong exotherm. The adduct forms as a Michael Addition product between the active hydrogen of the amine and the double bond of the acrylamide monomer, the tertiary amine product itself acting as a catalyst to promote the Michael Addition reactions.

The molar ratio of the acrylamide (acrylamide double bond(s)) to the active hydrogens of the amine broadly may be between about 0.1 and 2.0, and more often is between about 0.5 and 1.5. At a molar ratio below 1, there generally are secondary amine hydrogens (active hydrogens) left for further reaction. At molar ratios above 1, there is excess acrylamide in the composition that could be available for free radical polymerization in the synthesis of the polyacrylamide composition. Often, such adducts are prepared at a mole ratio of acrylamide to active amine hydrogens of greater than about 1.

Using DETA and acrylamide in a 1:5 mole ratio of amine to acrylamide (a 1:1 mole ratio of acrylamide to amine active hydrogens), one obtains the following idealized structure (1) for the polyacrylamide-adduct:

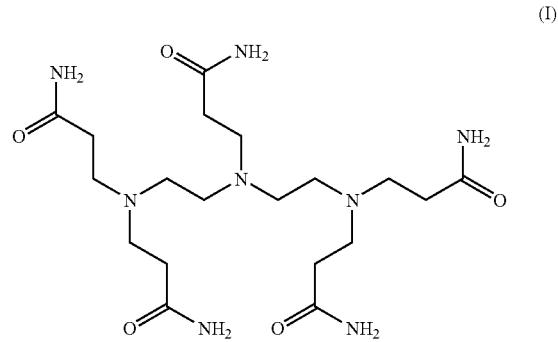

(I)

Suitable amines for preparing the polyacrylamide adducts include ammonia, ethylene diamine, diethylene triamne (DETA), triethylene tetraamine (TETA), low molecular weight polyamidoamines, polyvinylamines and copolymers of vinyl amine with other unsaturated co-polymerizable monomers such as vinyl acetate and vinyl alcohol to name a few. Suitable polyamidoamines are generally prepared by reacting a dicarboxylic acid (diacid), (or a corresponding dicarboxylic acid halide, or diester thereof) with a polyalkylene polyamine. For example, suitable polyamidoamines can be made by reacting suitable polyalkylene polyamines, such as polyethylenepolyamines including diethylenetriamine, triethylenetetramine, aminoethyl piperazine, tetraethylenepentamine, pentaethylenehexamine, N-(2-aminoethyl)piperazine, N,N-bis(2-aminoethyl)-ethylenediamine, diaminoethyl triaminoethylamine, piperazinethyl triethylenetetramine, and the like, with polycarboxylic acids such as succinic, glutaric, 2-methylsuccinic, adipic, pimelic, suberic, azelaic, sebacic, undecanedioic, dodecandioic, 2-methylglutaric, 3,3-dimethylglutaric and tricarboxypentanes such as 4-carboxypimelic; alicyclic saturated acids such as 1,2-cyclohexanedicarboxylic, 1-3-cyclohexanedicarboxylic, 1,4-cyclohexanedicarboxylic and 1-3-cyclopentanedicarboxylic; unsaturated aliphatic acids such as maleic, fumaric, itaconic, citraconic, mesaconic, aconitic and hexane-3-diotic; unsaturated alicyclic acids such as Δ4-cyclohexenedicarboxylic; aromatic acids such as phthalic, isophtalic, terephthalic, 2,3-naphthalenedicarboxylic, benzene-1,4-diacetic, and heteroaliphatic acids such as diglycolic, thiodiglycolic, dithiodiglycolic, iminodiacetic and methyliminodiacetic. Usually, diacids and their related diesters of the formula $RO_2C(CH_2)_nCO_2R$ (where n=1-10 and R=H, methyl or ethyl) and mixtures thereof are preferred. Adipic acid is readily available and is most often used.

Several classes of polyacrylamide-adducts prepared by reaction between an amine, especially a polyamine, a polyamidoamine, or a polyvinyl amine, and an acrylamide monomer as described above can be represented by the following formulae (II)-(V): These formulae represent only a small number of the kinds of polyacrylamide-adducts contemplated by the present invention, limited only by the nature of the amine, preferably a polyamine, reacted with the complement acrylamide monomer(s).

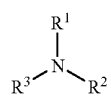
(II)

Wherein $R^1$, $R^2$, and $R^3$ are independently selected from hydrogen and the residue of an acrylamide monomer (resulting from a Michael Addition reaction between an acrylamide monomer and an active hydrogen of the amine, i.e., (—RC(O)NHR') where R and R' independently are a linear or branched $C_1$ to $C_6$ alkyl, which are optionally substituted, and wherein at least one of $R^1$, $R^2$, and $R^3$ is the residue of an acrylamide monomer. Suitable polyacrylamide adducts of formula II will have a molecular weight between about 200 and 350.

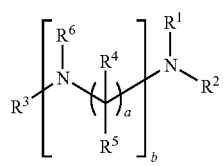
(III)

Wherein $R^1$, $R^2$, $R^6$ and $R^3$ are independently selected from hydrogen and the residue of an acrylamide monomer (resulting from a Michael Addition reaction between an acrylamide monomer and an active hydrogen of the amine, i.e., (—RC(O)NHR') where R and R' independently are a linear or branched $C_1$ to $C_6$ alkyl, which are optionally substituted, and wherein at least one of $R^1$, $R^2$, $R^6$ and $R^3$ is the residue of an acrylamide monomer; $R^4$ and $R^5$ are independently selected from hydrogen and a $C_1$ to $C_4$ alkyl; a is an integer independently selected from 1, 2 or 3 and b is an integer reflecting the number of repeating N-alkylene units (indicative of the molecular weight) of the polyacrylamide-adduct. Suitable polyacrylamide adducts of formula III will have a molecular weight between about 300 and 800.

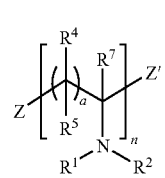
(IV)

Wherein $R^1$ and $R^2$ are independently selected from hydrogen and the residue of an acrylamide monomer (resulting from a Michael Addition reaction between an acrylamide monomer and an active hydrogen of the amine, i.e., (—RC(O)NHR'), R and R' independently are a linear or branched $C_1$ to $C_6$ alkyl, which are optionally substituted, and wherein at least one of $R^1$ and $R^2$ is the residue of an acrylamide monomer; $R^4$, $R^5$ and $R^7$ are independently selected from hydrogen and a $C_1$ to $C_4$ alkyl; a is an integer independently selected from 1, 2 or 3, n is an integer reflecting the number of repeating vinyl amine units (indicative of the molecular weight of the polyacrylamide-adduct) and Z and Z' independently can be the repeating unit(s) of another vinyl-type monomer such as vinyl acetate or vinyl alcohol, or can be hydrogen, or a linear or branched $C_1$ to $C_6$ alkyl. Suitable polyacrylamide adducts of formula IV will have a molecular weight between about 200 and 2000.

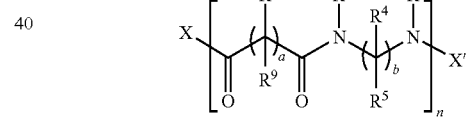
(V)

Wherein $R^1$ and $R^8$ are independently selected from hydrogen and the residue of an acrylamide monomer (resulting from a Michael Addition reaction between an acrylamide monomer and an active hydrogen of the amine, i.e., (—RC(O)NHR'), R and R' independently are a linear or branched $C_1$ to $C_6$ alkyl, which are optionally substituted, and wherein at least one of $R^1$ and $R^8$ is the residue of an acrylamide monomer; a and b are integers independently selected from 1, 2 or 3; $R^4$, $R^5$, $R^7$ and $R^9$ are independently selected from hydrogen or a $C_1$ to $C_4$ alkyl; n is an integer reflecting the number of repeating amidoamine units (indicative of the molecular weight) and X and X' independently can be the residue of the diacid (—OH, OR, or OMe, where Me is a salt-forming metal ion), the residue of the diamine (—H) used to prepare the polyamidoamine, the residue of an acrylamide monomer (reacting with the active hydrogen of the diamine residue, or it can be another known polyamidoamine terminus. Formula (V) constitutes a class of polyacrylamide-adducts made from well-known class of polyamidoamines that are made from polyalkylene polyamines and aliphatic diacids. Suitable polyacrylamide adducts of formula IV will have a molecular weight between about 200 and 6000.

For even higher molecular weight adducts, the polyacrylamide-adducts of formulae (I) through (V) can be joined or linked together using a bi-functional reactant such as methylene bis-acrylamide. In the case of the polyacrylamide-adduct(s) of formula (I), the resulting product made by linking the adducts with methylene bis-acrylamide may have the following structure:

conventionally added. Alternatively, the composition of the present invention also can be added to a previously prepared paper by padding, spraying, immersing, printing and the like.

The composition of this invention can be added to paper pulp over a wide range of pH values. However, best results usually are obtained by adding the composition to the paper pulp at a pH of from about 5 to about 8, most preferably from

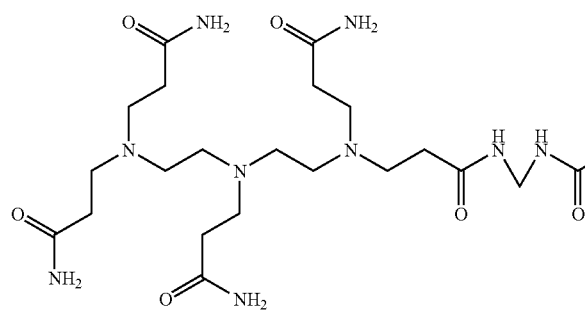

(VI)

The polyacrylamide-adducts of the present invention also can be quaternized to give the adducts a cationic character before they are used in accordance with the present invention. For example, epichlorohydrin can be reacted with residual secondary amines in the polyacrylamide-adducts to make a quaternary ammonium salt or an azetidinium cation (see formula (VII) below). Such residual secondary amines also could be functionalized with dimethyl sulfate.

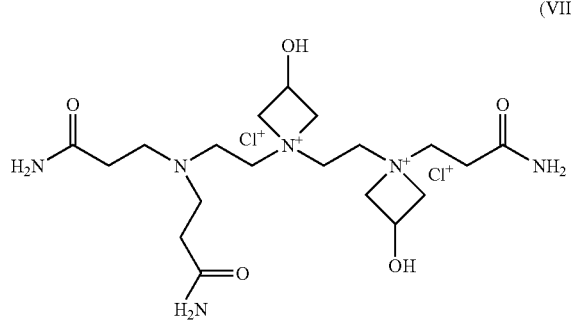

(VII)

As noted earlier, the polyacrylamide-adducts described above also can be used as a glyoxal scavenger in the final glyoxalated polyacrylamide composition. When used for this purpose, the adduct should be essentially free of unreacted acrylamide monomer.

The composition of glyoxalated polyacrylamide polymers of the present invention is readily employed in the manufacture of paper as a dilute aqueous solution. Generally, the composition used as a paper strengthening agent will have a solids concentration between about 5 and 30 weight percent. The composition is not limited to treating any particular type of paper and should find application in Kraft paper, sulfite paper, semichemical paper, and the like, including paper produced using both bleached and unbleached pulps.

When using the composition of this invention in papermaking, it can be added at any time before, during or after the paper is formed. The composition is conveniently added at the wet end of a paper-making facility to the dilute cellulose fiber suspensions, normally at a point when wet strength resins are about 5.5 to about 7. The composition of the present invention is readily absorbed by the cellulose fibers at these pH values.

While the present invention is not limited to any particular way for using the polyacrylamide compositions for strengthening paper products, the amount of added polymer can be as low as about 0.03% of the dry weight of the cellulose fibers, but usually does not exceed about 10% by weight. An amount in the range of 0.1% to 4% of the dry paper weight is more usual.

No additional or unusual heat curing is required with the compositions of the present invention, particularly since the resulting glyoxalated polyacrylamides of the present invention develop their optimum strength on normal drying of the paper. Thus, the polymer compositions of this invention develops strength both at room temperature and at temperatures at which paper is normally dried. (190° F. to 350° F.) (88° C. to 176° C.).

It will be understood that while the invention has been described in conjunction with specific embodiments thereof the foregoing description and examples are intended to illustrate, but not limit the scope of the invention. Other aspects, advantages and modifications will be apparent to those skilled in the art to which the invention pertains, and these aspects and modifications are within the scope of the invention, which is limited only by the appended claims.

COMPARATIVE EXAMPLE 1

Base Polymer Synthesis

A suitable 2 liter glass reactor was fitted with a stirring apparatus, thermometer, a nitrogen inlet, a condenser and then placed in heating bath. The reactor was charged with 320 g water, 120 g DADMAC solution (63% concentration), 200 g acrylamide solution (50% concentration) and 1.6 g 2-mercaptoethanol. The reactor was then heated to 80° C. at which time the acrylamide monomer feed (800 g acrylamide (50% concentration) and 6.4 g 2-mercaptoethanol) and the initiator solution feed (5 g ammonium persulfate in 150 g water) were initiated and continuously added to the reactor over 145 minutes and 160 minutes, respectively. After the initiator solution addition was completed, the temperature was maintained at 80° C. for an additional 30 minutes. To lower the un-reacted acrylamide concentration, t-butyl hydroperoxide (0.7 g solution 70%) and sodium formaldehyde sulfoxylate (0.3 g) were added. The final solution has a solids concentration of 40.1%, a pH of 3.3, a viscosity of 680 cPs at 25° C. and a charge density of 0.65 meq/gram.

COMPARATIVE EXAMPLE 2

Base Polymer Synthesis

A suitable 2 liter glass reactor was fitted with a stirring apparatus, thermometer, a nitrogen inlet, a condenser and then placed in heating bath. The reactor was charged with 320 g water, 125 g DADMAC solution (63% concentration), 200 g acrylamide solution (50% concentration) and 11 g 2-mercaptoethanol. The reactor was then heated to 80° C. at which time the acrylamide monomer feed (845 g acrylamide (50% concentration) and 49 g 2-mercaptoethanol) and the initiator solution feed (3.2 g ammonium persulfate in 150 g water) were initiated and continuously added to the reactor over 145 minutes and 160 minutes, respectively. After the addition of the initiator solution was completed, the temperature was maintained at 80° C. for an additional 30 minutes. To lower the un-reacted acrylamide concentration t-butyl hydroperoxide (0.7 g solution 70%) and sodium formaldehyde sulfoxylate (0.3 g) were added to the reaction mixture. The final solution has a solids concentration of 40.2%, a pH of 3.3, a viscosity of 25 cPs at 25° C. and a charge density of 0.022 meq/gram.

EXAMPLE 3

Base Polymer Synthesis

A suitable 2 liter glass reactor was fitted with a stirring apparatus, thermometer, a nitrogen inlet, a condenser and then placed in heating bath.

The reactor was charged with 320 g water, 120 g DADMAC solution (63% concentration), 122 g acrylamide solution (50% concentration) and 1 g 2-mercaptoethanol. The reactor was then heated to 80° C. at which time the acrylamide monomer feed (878 g acrylamide (50% concentration) and 7 g 2-mercaptoethanol) and the initiator solution feed (5 g ammonium persulfate in 150 g water) were initiated and continuously added to the reactor. The initiator solution flow rate is constant: the addition time is 190 minutes. The acrylamide monomer solution is added initially at a slow flow rate (285 g in the first 120 minute) and then with a very high flow rate (600 g in 60 minutes). The total addition time for the acrylamide monomer solution is 180 minutes. After the addition of the initiator solution was completed, the temperature was maintained at 80° C. for an additional 30 minutes. To lower the un-reacted acrylamide concentration t-butyl hydroperoxide (0.7 g solution 70%) and sodium formaldehyde sulfoxylate (0.3 g) were added. The final solution has a solids concentration of 40.2%, a pH of 3.3, a viscosity of 674 cPs at 25° C. and a charge density of 0.77 meq/gram. For the substantially same copolymer molecular weight, the charge density is significantly higher than was observed for the composition of Comparative Example A.

EXAMPLE 4

Base Polymer Synthesis

A suitable 2 liter glass reactor was fitted with a stirring apparatus, thermometer, a nitrogen inlet, a condenser and then placed in heating bath. The reactor was charged with 320 g water, 125 g DADMAC solution (63% concentration), 141 g acrylamide solution (50% concentration) and 9 g 2-mercaptoethanol. The reactor was then heated to 80° C. at which time the acrylamide monomer feed (900 g acrylamide (50% concentration) and 56 g 2-mercaptoethanol) and the initiator solution feed (3.2 g ammonium persulfate in 120 g water) were initiated and continuously added to the reactor. The initiator solution flow rate is constant over an addition time of 190 minutes. The acrylamide monomer solution is added initially at a slow flow rate (300 g in the first 120 minutes) and then at a higher flow rate (656 g in 60 minutes). The total addition time for the acrylamide monomer solution is 180 minutes. After the addition of the initiator solution was completed, the temperature was maintained at 80° C. for an additional 30 minutes. To lower the un-reacted acrylamide concentration t-butyl hydroperoxide (0.7 g solution 70%) and sodium formaldehyde sulfoxylate (0.3 g) were added. The final solution has a solids concentration of 41.1%, a pH of 3.3, a viscosity of 28.6 cPs at 25° C. and a charge density of 0.19 meq/gram. For substantially the same copolymer molecular weight, the charge density is significantly higher than the composition of Comparative Example B.

EXAMPLE 5

Base Polymer Synthesis

A suitable 2 liter glass reactor was fitted with a stirring apparatus, thermometer, a nitrogen inlet, a condenser and then placed in heating bath. The reactor was charged with 430 g water, 125 g DADMAC solution (63% concentration), 132 g acrylamide solution (50% concentration), 9 g 2-hydroxyethyl acrylate and 9 g 2-mercaptoethanol. The reactor was then heated to 80° C. at which time the acrylamide monomer feed (788 g acrylamide (50% concentration), 51 g hydroxyethyl acrylate and 56 g 2-mercaptoethanol) and the initiator solution feed (3.2 g ammonium persulfate in 120 g water) were initiated and continuously added to the reactor. The initiator solution flow rate is constant over a total addition time of 190 minutes. The acrylamide monomer solution is added initially at a slow flow rate (295 g in the first 120 minute) and then at a very high flow rate (600 g in 60 minutes). The total addition time for the acrylamide monomer solution is 180 minutes. After the addition of the initiator solution was completed, the temperature was maintained at 80° C. for an additional 30 minutes. To lower the un-reacted acrylamide concentration, t-butyl hydroperoxide (0.7 g solution 70%) and sodium formaldehyde sulfoxylate (0.3 g) were added. The final solution has a solids concentration of 40.6%, a pH of 3.3, a viscosity of 23.1 cPs at 25° C. and a charge density of 0.165 meq/gram.

EXAMPLE 6

Base Polymer Synthesis

A suitable 2 liter glass reactor was fitted with a stirring apparatus, thermometer, a nitrogen inlet, a condenser and then placed in heating bath. The reactor was charged with 400 g water, 125 g DADMAC solution (63% concentration), 120 g acrylamide solution (50% concentration), 9 g 2-hydroxyethyl acrylate, 19 g solution of a polyacrylamide-adduct (the adduct of Formula I, having a concentration 56% by weight) and 7 g 2-mercaptoethanol. The reactor was then heated to 80° C. at which time the acrylamide monomer feed (680 g acrylamide (50% concentration), 51 g hydroxyethyl acrylate, 110 g solution of the polyacrylamide-adduct (the adduct of Formula I, having a concentration 56% by weight) and 41 g 2-mercaptoethanol) and the initiator solution feed (3.2 g ammonium persulfate in 120 g water) were initiated and continuously added to the reactor. The initiator solution flow rate is constant over a total addition time of 190 minutes. The acrylamide monomer solution is added initially at a slow flow rate (282 g in the first 120 minutes) and then at a much higher flow rate (600 g in 60 minutes). The total addition time for the acrylamide monomer solution is 180 minutes. After the addition of the initiator solution was completed, the temperature was maintained at 80° C. for an additional 30 minutes. To lower the concentration of any un-reacted acrylamide, t-butyl hydroperoxide (0.7 g solution 70%) and sodium formaldehyde sulfoxylate (0.3 g) were added. The final solution has a solids concentration of 40.7%, a pH of 3.3, a viscosity of 18.9 cPs at 25° C. and a charge density of 0.193 meq/gram.

EXAMPLE 7

Glyoxalation of Comparative Example 1

To a one-liter glass reactor equipped with condenser, stirrer and a jacketed connection to a circulated constant temperature water bath, were added 119.8 g of the polyacrylamide composition of Comparative Example 1, 308.1 g water, 37.1 g of a 40% weight glyoxal aqueous solution, and 36 g of a sodium phosphate buffer solution (pH 7.6, 7.3% concentration). The temperature was set to 30° C. The pH was adjusted to 7.6 by the addition of 12.5 g of 3% sodium hydroxide solution. The pH of the solution was maintained at 7.6 by continuously adding 0.3% sodium hydroxide. As soon as the Brookfield viscosity of the reaction solution reached 20 cPs, the pH was lowered to 6.6 by adding 1.06 g of a 35% weight sulfuric acid aqueous solution, to slow the rate of the glyoxalation reactions. When the polymer reaction solution reached a Brookfield viscosity of 36 cPs, the pH was lowered further to 3.3 with 2.36 g of a 35% weight sulfuric acid solution. A sodium citrate buffer solution (pH 3.3, 15.0% concentration) was added in an amount of 44.2 g. Then, 9.8 g of a 40% glyoxal solution was post-added. The final solids content of the composition was 13.58% by weight. Dilution water was added to adjust the final solids to about 12.5%. The resulting resin has a cationic charge density of 0.55 meq/gm, a pH of 3.25, and a viscosity of 22.9 cPs at 25° C. The shelf life of the resulting resin is at least 45 days at 25° C.

EXAMPLE 8

Glyoxalation of Comparative Example 2

To 1 liter glass reactor equipped with condenser, stirrer and a jacketed connection to a circulated constant temperature water bath, were added 208.8 g of the polyacrylamide composition of Comparative Example B, 114.7 g water, 49.6 g of a 40% weight glyoxal aqueous solution, and 57.5 g of a sodium phosphate buffer solution (pH of 8.0 at a 7.3% by weight concentration). The temperature was set to 30° C. The pH was adjusted to 8.0 by the addition of 18.0 g of a 3% by weight sodium hydroxide solution. The pH of the solution was maintained at about 8 by continuously adding 0.3% sodium hydroxide. As soon as the Brookfield viscosity of the reaction solution reached about 20 cPs, the addition of the 0.3% by weight sodium hydroxide solution was discontinued. Then, the pH was lowered to 7.2 by adding 0.69 g of a 35% weight sulfuric acid aqueous solution to slow the rate of the glyoxalation reactions. When the polymer reaction solution reached a Brookfield viscosity of about 58 cPs, the pH was lowered to 3.3 with 4.22 g of a 35% weight sulfuric acid solution. A sodium citrate buffer solution (pH 3.3 at a 15.0% by weight solids concentration) was added in an amount of 58.4 g. Then, 2.1 g of a 40% glyoxal solution was post-added. The final solids content was 21.5%. Dilution water was added to adjust the final solids content to 20% by weight. The resulting resin has a cationic charge density of 0.31 meq/gm, a pH of 3.35 and a viscosity of 21.9 cPs at 25° C. The resulting resin's shelf life was at least 71 days at 25

EXAMPLE 9

Glyoxalation of Example 3

To 1 liter glass reactor equipped with condenser, stirrer and a jacketed connection to a circulated constant temperature water bath, were added 119.5 g of the polyacrylamide composition of Example 3, 308.4 g water, 37.1 g of a 40% weight glyoxal aqueous solution, and 36 g of a sodium phosphate buffer solution (pH 7.6 at a 7.3% by weight concentration). The temperature was set to 30° C. The pH was adjusted to 7.6 by the addition of 12.8 g of 3% sodium hydroxide solution. The pH of the solution was maintained at 7.6 by continuously adding 0.3% sodium hydroxide solution. As soon as the Brookfield viscosity of the reaction solution reached 20 cPs, the pH was lowered to 6.6 by adding 1.1 g of a 35% by weight sulfuric acid aqueous solution to lower the glyoxalation rate. When the polymer reaction solution reached a Brookfield viscosity of 36 cPs, the pH was lowered to 3.3 with 2.4 g of a 35% by weight sulfuric acid solution to quench the glyoxal reactions. A sodium citrate buffer solution (pH 3.3 at a 15.0% by weight solids concentration) was added in an amount of 44.2 g. Then, 9.8 g of a 40% glyoxal solution was post-added. The final solids content was 13.6 weight %. The dilution water was added to adjust the final solids content to 12.5%. The resulting resin has a cationic charge density of 0.68 meq/gm, a pH of 3.25 and a viscosity of 23.7 cPs at 25° C. The resulting resin's shelf life was at least 44 days at 25° C.

EXAMPLE 10

Glyoxalation of Example 4

To a 1 liter glass reactor equiped with condenser, stirrer and a jacketed connection to a circulated constant temperature water bath, were added 204.3 g of the polyacrylamide composition of Example 4, 119.3 g water, 49.6 g of a 40% weight glyoxal aqueous solution, and 57.5 g of a sodium phosphate buffer solution (pH 8.0, 7.3% by weight concentration of solids). The temperature was set to 30° C. The pH was adjusted to 8.0 by the addition of 18.0 g of a 3% sodium hydroxide solution. The pH of the solution was maintained at 8.0 by continuously adding 0.3% by weight sodium hydroxide solution. As soon as the Brookfield viscosity of the reaction solution reached about 20 cPs, the addition of the 0.3% sodium hydroxide addition was discontinued. This process consigned about 44 g of the 0.3% NaOH solution. Then, the pH was lowered to 7.2 by adding 0.69 g of a 35% by weight sulfuric acid aqueous solution, to slow the rate of the glyoxalation reaction. When the polymer reaction solution reached a Brookfield viscosity of about 58 cPs, the pH was lowered to 3.3 with 4.2 g of a 35% by weight sulfuric acid solution to quench the glyoxalation reactions. A sodium citrate buffer solution (pH 3.3, 15% by weight concentration) was added in an amount of 58.4 g. Then, 2.1 g of a 40% glyoxal solution was post-added. The final solids content was 21.4% by weight. Dilution water was added to adjust the final solids content to 20% by weight. The resulting resin has a cationic charge density of 0.43 meq/gm, a pH of 3.35 and a viscosity of 23.9 cPs at 25° C. The resulting resin's shelf life was at least 70 days at 25

EXAMPLE 11

Glyoxalation of Example 5

To 1 liter glass reactor equipped with condenser, stirrer and a jacketed connection to a circulated constant temperature water bath, were added 206.6 g of the polyacrylamide composition of Example 5, 109.8 g water, 48.8 g of a 40% weight glyoxal aqueous solution, and 57.5 g of a sodium phosphate buffer solution (pH 8.0, 7.3% by weight concentration). The temperature was set to 30° C. The pH was adjusted to 8.0 by the addition of 30.0 g of a 3% sodium hydroxide solution. The pH of the solution was maintained at 8.0 by continuously adding 0.3% by weight sodium hydroxide solution. As soon as the Brookfield viscosity of the reaction solution reached 20 cPs, the 0.3% sodium hydroxide addition was discontinued. This process consumed about 40 g of the 0.3% by weight NaOH solution. Then, the pH was lowered to 7.2 by adding 0.72 g of a 35% by weight sulfuric acid aqueous solution to reduce the rate of the glyoxalation reactions. When the polymer reaction solution reached a Brookfield viscosity of 58 cPs, the pH was lowered to 3.3 with 4.7 g of a 35% by weight sulfuric acid solution to quench the glyoxalation reactions. A sodium citrate buffer solution (pH 3.3, 15.0% by weight concentration) was added in an amount of 58.4 g. Then, 2.1 g of a 40% glyoxal solution was post-added. The final solids content was 21.45% by weight. Dilution water was added to adjust the final solids content to 20% by weight. The resulting resin has a cationic charge density of 0.45 meq/gm, a pH of 3.35 and a viscosity of 23.9 cPs at 25° C. The resulting resin's shelf life was at least 92 days at 25° C.

EXAMPLE 12

Glyoxalation of Example 6

To a 1 liter glass reactor equipped with condenser, stirrer and a jacketed connection to a circulated constant temperature water bath, were added 206.6 g of the polyacrylamide composition of Example 6, 27.1 g water, 43.5 g of a 40% weight glyoxal aqueous solution, and 41.1 g of a sodium phosphate buffer solution (pH 8.0, 7.3% by weight concentration). The temperature was set to 30° C. The pH was adjusted to 8.0 by the addition of 49.5 g of a 4% by weight sodium hydroxide solution. The pH of the solution was maintained at 8.0 by continuously adding 0.3% by weight sodium hydroxide solution. As soon as the Brookfield viscosity of the reaction solution reached about 20 cPs, the 0.3% sodium hydroxide addition was discontinued. This process consumed about 120 g of 0.3% NaOH solution. Then, the pH was lowered to 7.2 by adding 1.7 g of a 35% weight sulfuric acid aqueous solution to slow the rate of the glyoxalation reactions. When the polymer reaction solution reached a Brookfield viscosity of about 58 cPs, the pH was lowered to 3.3 with 8.2 g of a 35% weight sulfuric acid solution to quench the glyoxalation reactions. A sodium citrate buffer solution (pH 3.3, 15.0% by weight concentration) was added in an amount of 58.4 g. Then, 2.1 g of a 40% glyoxal solution was post-added. The final solids content was 21.4% by weight. Dilution water was added to adjust the final solids to 20% by weight. The resulting resin has a cationic charge density of 0.56 meq/gm, a pH of 3.35 and a viscosity of 19.9 cPs at 25° C.

The charge densities of the cationic polyacrylamide compositions and the related glyoxylated compositions are determined by using the Muetek PCD 03 particle charge detector and PCD-Two Version Two Titrator. The non-volatile content of the composition is initially determined. A 10 mL sample adjusted to a 0.5% solids content is placed in the cylindrical test cell with the fitted displacement piston of the Muetek PCD 03 instrument. The oscillating piston forces the sample liquid to flow along the plastic wall of the test cell so that a streaming current is generated. Under the action of van der Waal forces, the polycationic resin is preferentially adsorbed at the surface of the test cell and displacement piston. As the diffuse cloud of counter-ions is sheared off the cationic colloids by the liquid flow in the test cell, the so-called streaming current is induced. The streaming current is measured by two noble electrodes in the test cell wall and is immediately shown on the instrument display. During the titration of the composition, standard polyanionic PVSK (commercially available from Muetek) is added to the dilute solution of the sample of the cationic composition until the cationic composition reaches the point of zero charge (the complexing charge neutralization is understood to take place at 1:1 stoichiometry). The original charge amount for the composition then is calculated from the titrant (standard polyanionic PVSK) consumption. The streaming current is used to calculate the milliequivalents of cationic charge per gram solid resin (meq+/gram).

EXAMPLE 13

51.5 grams DETA (0.5 moles) and 426 grams of an acrylamide solution (50% by weight acrylamide—3 moles) are mixed in a suitable reactor at room temperature. A strong exothermic effect is noticed, with the temperature of the reaction mixture rising to about 60° C. An analysis of the resulting reaction product shows the amount of the un-reacted acrylamide to be 6% (by HPLC) and confirms the mole ratio of reacted acrylamide to polyamine to be 2.5:0.5 (i.e., each molecule of DETA (having five active hydrogens) reacts with five molecules of acrylamide. This chemical structure was confirmed by NMR.

EXAMPLE 14

A reaction between 51.5 grams DETA (0.5 moles) and 355 g of an acrylamide solution (50% by weight acrylamide-2.5 moles) is performed as in Example A-1. The un-reacted acrylamide detected in the reaction product is 231 ppm (i.e., the reaction is essentially quantitative)

EXAMPLE 15

A reaction between 51.5 grams DETA (0.5 moles) and 213 g of an acrylamide solution (50% by weight acrylamide-1.5 moles) is performed as in Example A-1. After cooling the reaction mixture to 5° C., 85 g of epichlorohydrin is added over a period of 15 minutes. To form the azetidinium moieties, the resulting reaction mixture is heated at a temperature of 60° C. for a period of 30 minutes.

The present invention has been described with reference to specific embodiments. However, this application is intended to cover those changes and substitutions that may be made by those skilled in the art without departing from the spirit and the scope of the invention. Unless otherwise specifically indicated, all percentages are by weight. Throughout the specification and in the claims the term "about" is intended to encompass + or −5% and preferably is only about + or −2%.

We claim:

1. A method for producing a cationic polyacrylamide composition comprising (1) initially reacting one portion of an acrylamide monomer mixture in the presence of a cationic monomer and an initiator to produce a cationic polyacrylamide and (2) thereafter reacting a second portion of the acrylamide monomer mixture in the presence of the previously prepared cationic polyacrylamide and an initiator, wherein the acrylamide monomer mixture comprises an acrylamide monomer and wherein a polyacrylamide-adduct made by reacting an amine having active hydrogens with an acrylamide monomer is present during the initially reacting step (1).

2. The method of claim 1 wherein the initially reacting comprises a free radical polymerization of acrylamide monomer in the presence of the cationic monomer.

3. The method of claim 2 wherein the cationic monomer is selected from diallyl dimethyl ammonium chloride, 2-vinylpyridine, 4-vinylpryridine, 2-methyl-5-vinyl pyridine, 2-vinyl-N-methylpyridinium chloride, p-vinylphenyl-trimethyl ammonium chloride, 2-(dimethylamino) ethyl methacrylate, trimethyl(p-vinylbenzyl)ammonium chloride, p-dimethylaminoethylstyrene, dimethylaminopropyl acrylamide, 2-methylacroyloxyethyltrimethyl ammonium methylsulfate, 3-acrylamido-3-methylbutyl trimethyl ammonium chloride, 2-(dimethylamino) ethyl acrylate and mixtures thereof.

4. The method of claim 1 wherein the one portion of the acrylamide monomer mixture comprises from 20 to 75% of the acrylamide monomer and the initially reacting comprises from 40 to 75% of a total reaction period for producing the cationic polyacrylamide composition.

5. The method of claim 4 wherein the second portion of the acrylamide monomer mixture is added for reaction in step (2) at a more rapid rate than the one portion of the acrylamide monomer mixture is added for reaction in step (1).

6. The method of claim 1 wherein the acrylamide monomer is selected from the group consisting of acrylamide, methacrylamide, ethylacrylamide, crotonamide N-methyl acrylamide, N-butyl acrylamide, N-ethyl methacrylamide and mixtures thereof.

7. The method of claim 1 wherein the acrylamide monomer mixture comprises an additional component selected from the group consisting of a chain transfer agent, a diluter monomer, a functional monomer and mixtures thereof.

8. The method for producing a cationic polyacrylamide composition according to claim 1 wherein the polyacrylamide-adduct has formula (II):

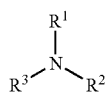
(II)

wherein $R^1$, $R^2$, and $R^3$ are independently selected from hydrogen and a residue of an acrylamide monomer resulting from a Michael Addition reaction between an acrylamide monomer and an active hydrogen of the amine, and wherein at least one of $R^1$, $R^2$, and $R^3$ is the residue of an acrylamide monomer.

9. The method for producing a cationic polyacrylamide composition according to claim 1 wherein the polyacrylamide-adduct has formula (III)

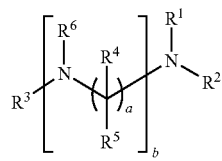
(III)

wherein $R^1$, $R^2$, $R^6$ and $R^3$ are independently selected from hydrogen and a residue of an acrylamide monomer resulting from a Michael Addition reaction between an acrylamide monomer and an active hydrogen of the amine and wherein at least one of $R^1$, $R^2$, $R^6$ and $R^3$ is the residue of an acrylamide monomer; $R^4$ and $R^5$ are independently selected from hydrogen and a $C_1$ to $C_4$ alkyl; a is an integer independently selected from 1, 2 or 3 and b is an integer reflecting the number of repeating N-alkylene units of the polyacrylamide-adduct.

10. The method for producing a cationic polyacrylamide composition according to claim 1 wherein the polyacrylamide-adduct has formula (IV):

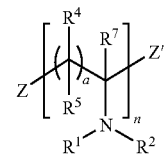
(IV)

wherein $R^1$ and $R^2$ are independently selected from hydrogen and a residue of an acrylamide monomer resulting from a Michael Addition reaction between an acrylamide monomer and an active hydrogen of the amine and wherein at least one of $R^1$ and $R^2$ is the residue of an acrylamide monomer; $R^4$, $R^5$ and $R^7$ are independently selected from hydrogen and a $C_1$ to $C_4$ alkyl; a is an integer independently selected from 1, 2 or 3, n is an integer reflecting the number of repeating vinyl amine units indicative of the molecular weight of the polyacrylamide-adduct and Z and Z' independently are selected from the group consisting of repeating units of another vinyl monomer, hydrogen, and a linear or branched $C_1$ to $C_6$ alkyl.

11. The method for producing a cationic polyacrylamide composition according to claim 1 wherein the polyacrylamide-adduct has formula (V):

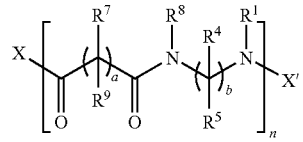
(V)

wherein $R^1$ and $R^8$ are independently selected from hydrogen and a residue of an acrylamide monomer resulting from a Michael Addition reaction between an acrylamide monomer and an active hydrogen of the amine and wherein at least one of $R^1$ and $R^8$ is the residue of an acrylamide monomer; a and b are integers independently selected from 1, 2 or 3; $R^4$, $R^5$, $R^7$ and $R^9$ are independently selected from the group consisting of hydrogen and a $C_1$ to $C_4$ alkyl; n is an integer indicative of the molecular weight of polyacrylamide-adduct and X and X' independently are selected from the group consisting of —OH, OR, where R is a $C_1$ to $C_4$ alkyl and OMe, where Me is a salt-forming metal ion, a residue of a diamine, and a residue of an acrylamide monomer.

12. The method of claim 1 wherein the acrylamide monomer mixture comprises an acrylamide monomer and a polyacrylamide-adduct made by reacting an amine having active hydrogens with an acrylamide monomer.

* * * * *